United States Patent [19]
Scharrer et al.

[11] Patent Number: 6,056,441
[45] Date of Patent: May 2, 2000

[54] TIRE TRACK ROUGHENED ORIFICE COMPENSATED HYDROSTATIC BEARING

[75] Inventors: Joseph K. Scharrer, Fair Oaks, Calif.; Robert F. Hecht, Baltimore, Md.

[73] Assignee: The Boeing Company, Seal Beach, Calif.

[21] Appl. No.: 08/991,256

[22] Filed: Dec. 16, 1997

[51] Int. Cl.⁷ .................................................. F16C 32/06
[52] U.S. Cl. .............................. 384/118; 384/100; 384/114
[58] Field of Search ..................................... 384/100, 114, 384/118, 119

[56] References Cited

U.S. PATENT DOCUMENTS

| | | | |
|---|---|---|---|
| 4,671,676 | 6/1987 | Chen et al. | 384/100 |
| 5,017,023 | 5/1991 | Scharrer et al. | 384/114 |
| 5,238,308 | 8/1993 | Lang et al. | 384/100 X |
| 5,310,265 | 5/1994 | Stangeland et al. | 384/100 |

*Primary Examiner*—Thomas R. Hannon
*Attorney, Agent, or Firm*—Steven E. Kahm; Stout, Uxa, Buyan & Mullins, L.L.P.; Harry B. Field

[57] ABSTRACT

An orifice compensated hydrostatic bearings wherein a roughened surface area retards the hydrostatic fluid flow exiting the hydrostatic bearing reducing the whirl frequency ratio while increasing the bearing stiffness and life.

8 Claims, 1 Drawing Sheet

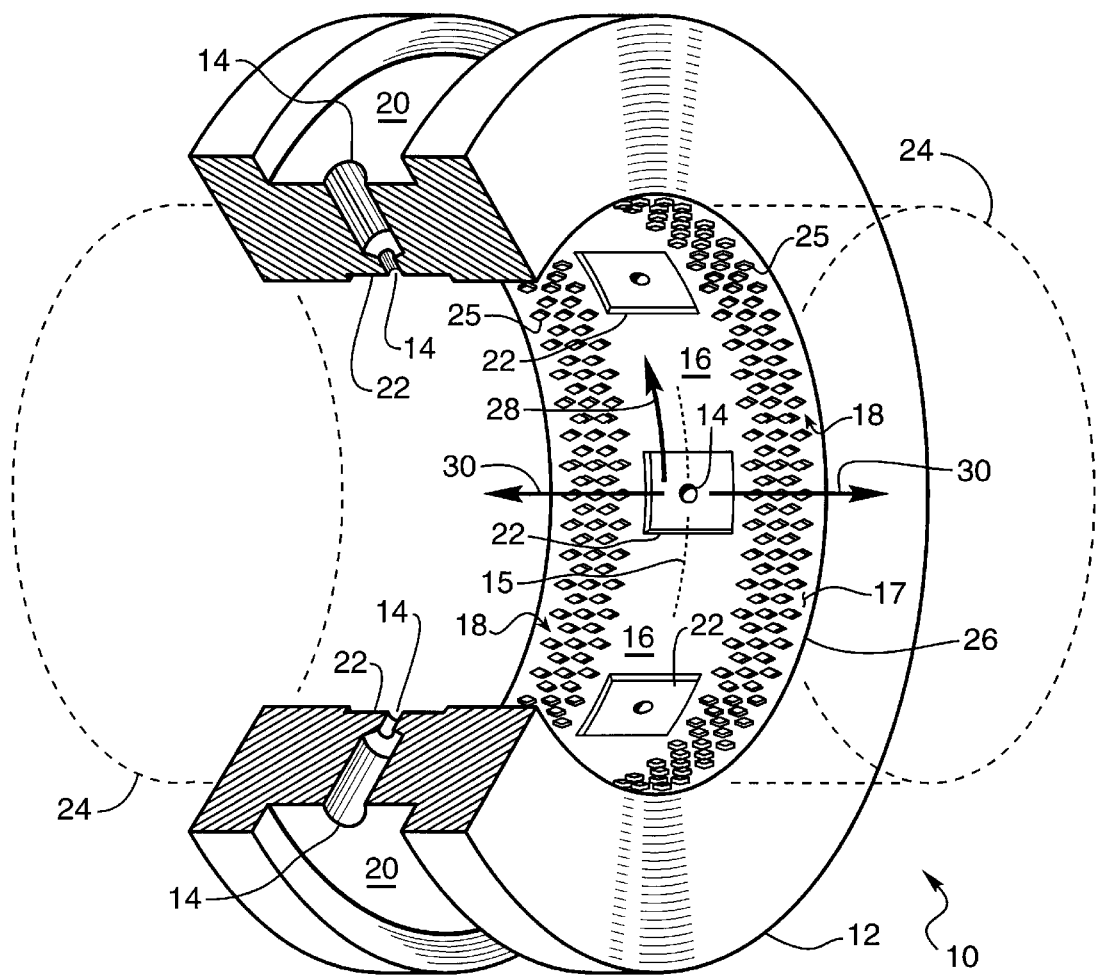

TIRE TRACK ROUGHENED ORIFICE COMPENSATED HYDROSTATIC BEARING

BACKGROUND OF THE INVENTION

1. Field of the Invention

This invention relates to orifice compensated hydrostatic bearings and more particularly to using a roughened surface for reducing the whirl frequency ratio of fluid within the annulus of the orifice compensated hydrostatic bearings.

2. Description of the Related Art

Orifice compensated hydrostatic bearings are very popular but to make them more robust they have a large clearance to radius ratio for reducing rubbing on start up and shut down which increases the bearing life. The increased clearance to radius ratio however permits cross coupling forces to grow which are a rotor destabilizing mechanism. The cross coupling forces are caused by the increased flow of the fluid film within the annulus traveling tangentially with the surface of the rotor, as the fluid moves from the high pressure source to the low pressure sump. The resulting increase in the whirl frequency ratio increases rotor destabilizing forces and reduces the rotor dynamic stability allowances.

SUMMARY OF THE INVENTION

The invention relates to an enhancement to a standard orifice compensated hydrostatic bearing wherein, the annulus lands that make the orifice compensated hydrostatic bearings more robust, decrease the fluid flow, reducing the cross coupling forces which increase the journal's whirl frequency ratio. By using tire track roughened lands the fluid flow from the feed orifice flowing to the outside edge of the hydrostatic bearing which causes cross coupling forces is reduced producing a more stable bearing with a lower whirl frequency ratio and higher damping which benefits the rotordynamics of the system.

OBJECTS OF THE INVENTION

It is an object of the invention to reduce the cross coupling forces in a hydrostatic bearing.

It is an object of the invention to enhance damping of the hydrostatic film such that a machine can operate safely at a high rate of speed.

It is an object of the invention to reduce rotor motion of a journal after a perturbing force is applied to the journal.

It is an object of the invention to provide a smooth stable operation with no rotordynamic loads that could result in a premature wearing out of the machine.

It is an object of the invention to reduce the whirl frequency ratio of the hydrostatic bearing.

It is another object of the invention to increase the life of the bearing.

It is a further object of the invention to increase the stiffness and damping of the hydrostatic bearing relative to the cross-coupling effects.

Other objects, advantages and novel features of the present invention will become apparent from the following detailed description of the invention when considered in conjunction with the accompanying drawing.

BRIEF DESCRIPTION OF THE DRAWING

The FIGURE is a cutaway perspective view of the preferred embodiment of the bearing housing

DETAILED DESCRIPTION OF THE PREFERRED EMBODIMENT

Referring to the FIGURE, shown is a cross section of a hydrostatic bearing 10 having a housing 12 having bore 26 with orifices 14 for injecting a fluid inside of the annulus. The hydrostatic fluid entering orifice 14 comes from a common manifold 20 so that the pressure is equal in all of the orifices 14. Orifice 14 leads to recess 22 on the bore 26 of housing 12. The hydrostatic fluid from the recess 22 pushes against journal 24 (dashed) and separates the journal 24 from the bearing bore 26 of the housing 12 to form a hydrostatic bearing. In a standard orifice compensated hydrostatic bearing the land area 16 (the area from the center line 15 to the exit 17) is smooth. When the journal 24 is at rest, the hydrostatic fluid flows from the high pressure area in recess 22 across the land area 16 to the exit 17 of the bearing 10 as shown by the axial through flow vector 30. When the journal 24 is rotating at high speeds the hydrostatic fluid is influenced by the journal to move tangentially as indicated by fluid flow vector 28 (couette flow) with a resultant vector between 28 and 30. The resultant fluid flow causes cross coupling forces in the hydrostatic bearing which increase the whirl frequency ratio, thereby reducing the bearing's rotordynamic effectiveness.

The roughened pattern 25 is added to the bearing bore land area 16 to retard the couette flow 28, and to slow the axial flow 30, thus reducing leakage of fluid at exit 17. Enhancing the surface roughness extends the boundary layer effect into the flow field, slowing the fluid flow, particularly near the roughened surfaces. Retarding couette flow 28 reduces the cross coupling forces and enhances damping for a better whirl frequency ratio and a more stable bearing. The retarding of the axial flow 30 reduces the leakage and the secondary flow of the machine for a better hydrodynamic performance.

A diamond knurled pattern is shown in the FIGURE but other shapes or patterns which reduce fluid flow can be used. Multiple roughness patterns have been used to retard both the tangential couette flow 28 and the axial flow 30 in the annulus formed by the bearing bore 26 and the journal 24, such as flat bottom holes and high machine surface roughness machining.

The roughened area 18 is added to the land area 16 of the bearing in the circular width feature, referred to as tire tracks, because of ease of manufacture. Tooling was not needed to roughen the land area 16 between the raised areas of recesses 22 because there is very little benefit to roughing the communication of the fluid between the recesses 22. The key feature is to retard the fluid between the recesses 22 and the exit at edge 17 by inserting the roughness in tire track fashion therebetween.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A roughened orifice compensated hydrostatic bearing comprising:
    a hydrostatic bearing housing, the housing having a cylindrical inside surface with a center and an edge on either side of the center;
    a plurality of spaced orifices disposed circumferentially along the cylindrical inside surface of said housing for introducing a pressurized fluid into the housing at the center of the inside surface such that the fluid enters the hydrostatic bearing surface radially at the center of said inside surface and exits axially at said edges;
    a first roughened annular area on said cylindrical inside surface between the center and one edge to retard the fluid flow;

a second roughened annular area on said cylindrical inside surface between the center and the other edge; and a smooth area on the inside surface of the hydrostatic bearing along the center thereof, said smooth area being disposed between said first and second roughened areas and abutting each of said roughened annular areas.

2. A roughened orifice compensated hydrostatic bearing as in claim 1 wherein:

the roughened area has a diamond knurled pattern.

3. The roughened orifice compensated hydrostatic bearing as in claim 1, and further comprising a recess disposed about each of said spaced orifices on said cylindrical inside surface, said smooth area extending through said recesses and along the circumferential portions of the cylindrical inside surface which extend between each of said recesses.

4. The roughened orifice compensated hydrostatic bearing as in claim 3, wherein said recesses each have an axial width, and the axial width of said smooth area approximately equals the axial width of said recesses.

5. A roughened orifice compensated hydrostatic bearing comprising:

a hydrostatic bearing housing, the housing having a land with a center and an edge on either side of the center;

a plurality of orifices for introducing a pressurized fluid into the housing such that the fluid enters the hydrostatic bearing surface and flows along said land;

a first roughened annular area on said land between the center and one edge to retard the fluid flow;

a second roughened annular area on said land between the center and the other edge; and a smooth area on the land which is disposed between said first and second roughened areas, said smooth area extending circumferentially and abutting each of said roughened annular areas.

6. The roughened orifice compensated hydrostatic bearing as in claim 5, wherein each of the roughened areas has a diamond knurled pattern.

7. The roughened orifice compensated hydrostatic bearing as in claim 5, wherein said plurality of orifices are disposed circumferentially in a spaced relationship along said land, and are adapted to inject said fluid radially with respect to the land, said bearing further comprising a recess disposed about each of said spaced orifices on said land, said smooth area extending along circumferential portions of the land which extend between each of said recesses.

8. The roughened orifice compensated hydrostatic bearing as in claim 7, wherein said recesses each have an axial width, and the axial width of said smooth area approximately equals the axial width of said recesses.

* * * * *